United States Patent

[11] 3,611,356

[72] Inventor Alan K. Jensen
Livingston, N.J.

[21] Appl. No. 857,606

[22] Filed Sept. 12, 1969

[45] Patented Oct. 5, 1971

[73] Assignee Litton Business Systems, Inc.
Continuation of application Ser. No. 518,832, Jan. 5, 1966, now abandoned.

[54] DIGITAL TO ANALOG TRANSLATOR
11 Claims, 2 Drawing Figs.

[52] U.S. Cl. ........ 340/347 DA, 320/1

[51] Int. Cl. ........ H03k 13/16

[50] Field of Search ........ 340/347; 320/1; 328/151; 307/238, 243, 246

[56] References Cited

UNITED STATES PATENTS

| | | | |
|---|---|---|---|
| 3,155,959 | 11/1964 | Dobbie et al. | 340/347 |
| 3,430,228 | 2/1969 | Reeves et al. | 340/347 |
| 3,484,777 | 12/1969 | Delagrange | 340/347 |

*Primary Examiner*—Maynard R. Wilbur
*Assistant Examiner*—Michael K. Wolensky
*Attorneys*—Norman Friedman, Arthur T. Groeninger, Morris I. Pollack, Stephen E. Feldman and Elmer W. Edwards

ABSTRACT: A translator comprises a plurality of AND gates. Each AND gate has an input for a binary and a sampling signal. Upon receipt of a binary signal and sampling signal by one of the AND gates a capacitor is charged to the voltage of the sampling signal. Thereafter, that capacitor and other similarly charged capacitors are summed through a logical OR gate. The capacitors have values in proportion to the coded digital input. The logical OR gate in turn is tied to an output transistor which provides a signal which is the analog equivalent of the binary-coded number received at the AND gates.

INVENTOR
ALAN K. JENSEN
BY David Lesh...
ATTORNEY

DIGITAL TO ANALOG TRANSLATOR

This is a continuation of application Ser. No. 518,831, now abandoned.

This invention relates to a signal-translating apparatus and more particularly to a device for translating coded digital input signals into an analog output signal having a duration proportional to the values of the coded digital signals received.

In order to employ the output of a digital-computing device or data-processing system for a variety of direct uses such as process control, machine control, or the like, it is necessary to convert the output in digital form into an analog output signal. There are commonly found in the prior art many forms of devices which employ the techniques of voltage summing or current summing in order to produce the desired analog signals. These devices require precise switching circuits, various precision valued resistors, and constant current or constant voltage sources, which are controlled by the resistor networks and the switching circuits. The functioning of these devices is highly complex in order that the proper voltage levels be added or the proper values of current be summed for a correct output result.

The present invention provides a simpler approach than that found in the prior art and offers a technique for providing signals which are the analog to digital signals. This simpler approach does not depend upon complex switching circuits or resistive networks used in the prior art devices. Broadly stated, the invention contemplates an apparatus having first and second means for gating signals. The first gating means provides signals to means for storing signals upon receipt of both digital signals and sampling signals. The second gating means provides signals indicative of the signals stored in the storage means. Finally, there are means for providing signals in response to the signals from the second gating means which are the analog of the digital signals.

In one embodiment the apparatus of the invention provides for the use of a series of storage capacitors in graduated values such that their capacitances are proportional to the coded values of the input signals. For example, in the instance where a straight binary coded value is to be used, this input code having values of one, two, four and eight, the values of the capacitors employed follow the same binary valuations scheme, that is, values of one unit, two units, four units and eight units of capacity respectively. Input signals coded according to the input binary code are impressed on first terminals of a set of input AND gates. Second terminals of these AND gates receive a sampling signal so that the sampling of the inputs is done at a uniform time and for a uniform duration. The input AND gate or gates which receive both the sampling signal and a code unit of the input code are permitted to provide charging current to charge an associated capacitor in accordance with the binary unit value. The signals on the capacitor or capacitors are fed into a summing network, composed of an OR gate and are used to control the base of the output transistor switch for a period proportional to the total capacity charged. The transistor, which in its normal operating condition is on or conducting will be turned OFF by the signals appearing on its base from the OR gate. The length of time that the transistor is held off will be dependent upon the value of signals stored in the capacitors. Upon the discharge of the storage capacitors, the transistor will be permitted to go on signaling the end of the analog signal.

It is therefore an object of this invention to provide a new and improved form of digital to analog conversion device.

It is still another object of this invention to provide a new form of digital analog converter requiring a minimum number of switching circuits and decreasing greatly the need for resistive or switching control networks.

It is another object of this invention to provide a digital to analog conversion technique or system wherein a plurality of storage capacitors are employed, the value of these capacitors being equal their associated digital code representation.

Other objects and features of the invention will be pointed out in the following description and claims and illustrated in the accompanying drawings, which disclose, by way of example, the principles of the invention, and the best mode which has been contemplated for carrying it out.

Figure 1:
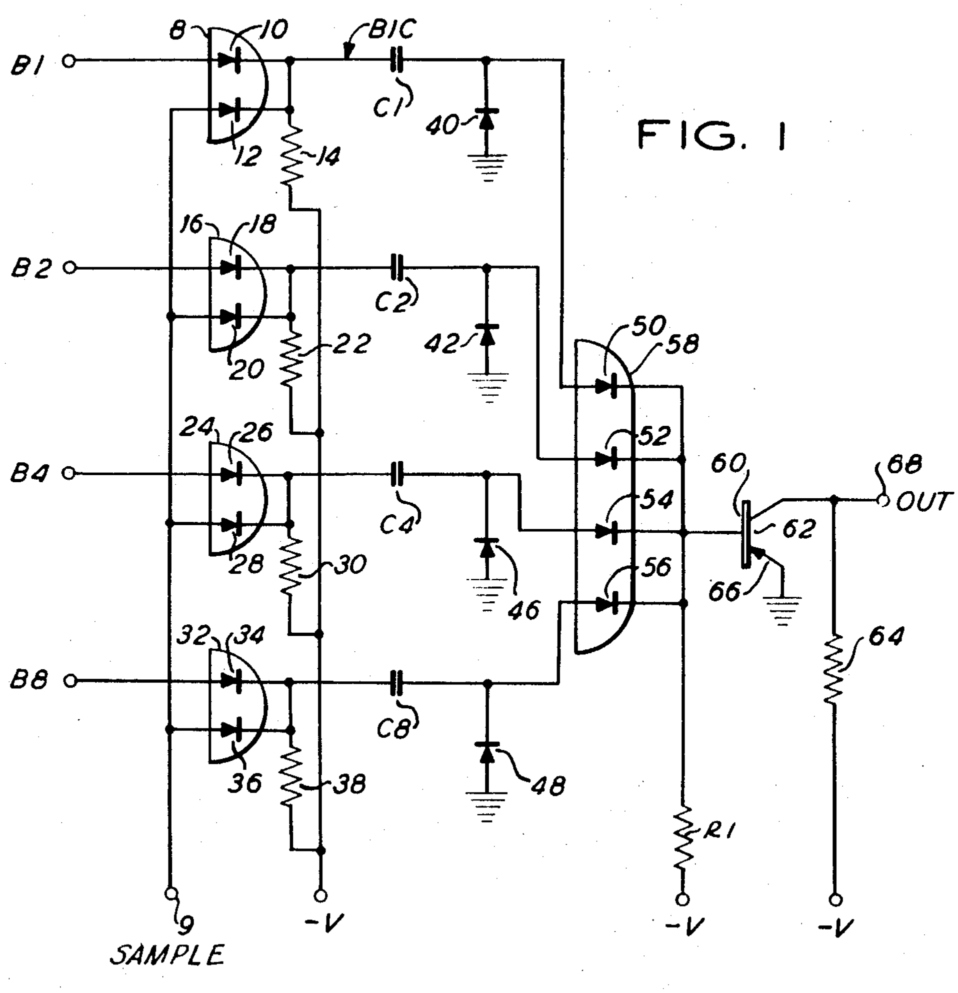
FIG. 1 is a schematic drawing of a digital to analog converter constructed in accordance with the concepts of the invention.

Turning now to FIG. 1, there is shown a digital to analog converting device constructed in accordance with the concepts of the invention. The device of FIG. 1 illustrates a converting apparatus for translating a number coded according to the normal binary progression into an output signal whose duration is proportional to the values of the input signal. The capacity of the capacitors C1, C2, C4 and C8 are proportioned according to the same binary progression. It should be understood that although the binary system has been employed in the illustrative drawing and description, this system may be employed with any other system of coding, for example, the 1225 or similar code merely by arranging the values of the capacitors in accordance with the code.

The signals of an input binary code are introduced on the terminals B1, B2, B4 and B8 in accordance with their equivalent binary digital values. A signal from the terminal B1 is fed to the anode of a diode 10 of a first AND gate 8. In a similar manner, an input signal on the terminal B2 is fed to the anode of a diode 18 of the AND gate 16. A signal on terminal B4 is fed to the anode of a diode 26 of the AND gate 24 and a signal on an output terminal B8 is fed to the anode of a diode 34 of the AND gate 32. Each of the AND gates 8, 16, 24 and 32 also receives a signal from the sample input terminal 9, and this signal is applied to the anodes of diode 12, 20, 28 and 36 of the respective AND gates 8, 16, 24 and 32. In addition, each of these AND gates is connected by means of bias resistors 14, 22, 30 and 38 respectively, to a source of negative potential −V. The output of the AND gate 8 is fed to a capacitor C1 where as the outputs of the AND gate 16 is fed to capacitor C2, the output of the AND gate 24 is fed to capacitor C4 and the output of the AND gate 32 is fed to capacitor C8. The subscript 1, 2, 4 and 8 for the capacitors indicate their relative capacities with respect to one another. Thus, capacitor C8 has eight times the capacity of the capacitor C1.

Capacitor C1 is connected to the cathode of a diode 40 whose anode is grounded. In a similar fashion the capacitor C2 is connected to the cathode of a diode 42 whose anode is also grounded. The capacitor C4 is tied to the cathode of a diode 46 whose anode is grounded while the capacitor C8 is tied to the cathode of a diode 48 whose anode is similarly grounded. In addition, the output terminal of the capacitor C1 is tied to the anode of a diode 50 whereas the output of the capacitor C2 is tied to an anode of a diode 52. In a similar fashion, capacitor C4 is tied to the anode of a diode 54 with the output of capacitor C8 tied to the anode of a diode 56. The cathodes of the diodes 50, 52, 54 and 56 are tied to a common point and to a resistor R1 to a source of negative potential −V. The diodes 50, 52, 54 and 56 with their resistor R1 and negative supply form a logical OR gate for summing the values of the outputs from the capacitors C1, C2, C4 and C8. The output of the OR gate 58 is fed to the base 60 of a PNP transistor 62. The collector of the transistor 62 is tied to the output terminal 68 as well as through a resistor 64 to a source of negative potential −V. The emitter 66 of the transistor 62 is connected to ground.

The sampling signal applied to the sample terminal 9 and each of the AND gates 8, 16, 24 and 32 may be generated by either a pulse source (not shown) which is producing sampling signals at regularly recurring intervals or may be produced by the input digital code itself. In addition, the sampling signals may be produced by means of a manually closable switch or the like. The only restraint placed upon the input signals representing the respective code units of the coded digital signals is that they must exceed in duration, the duration of the sampling pulse and overlap it both before and after the sampling pulse in order that the sample may truly detect the presence of the code units of the coded digital signals.

Figure 2:
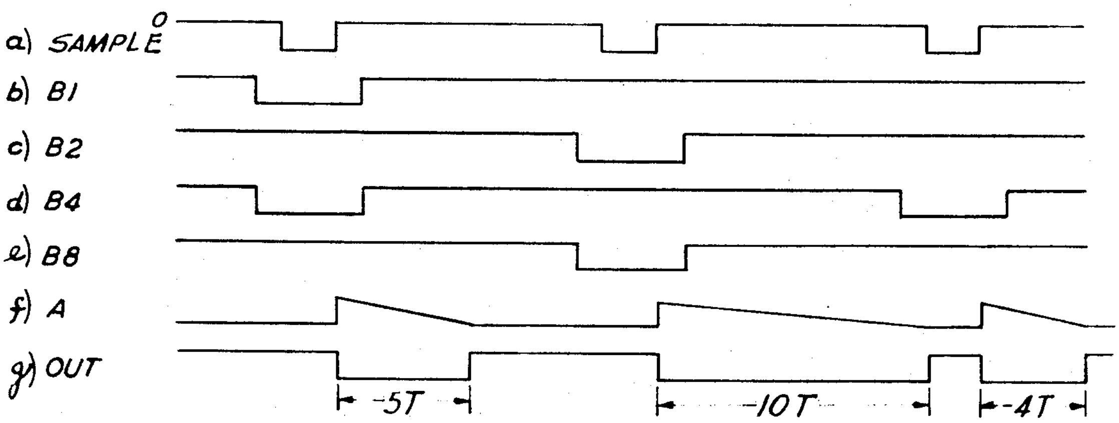
FIG. 2 shows the waveforms for the various input and output conditions of the device of FIG. 1.

The operation of the circuit of FIG. 1 will now be explained in greater detail with respect to the waveforms shown in FIG. 2. Line *a* of FIG. 2 illustrates the occurrence of a regularly spaced group of sampling pulses. The line *b* illustrates the presence of a signal at the input terminal B1. Line *c* shows the presence of a signal at the input terminal B2, line *d* shows a signal at the input terminal B4, whereas line *e* shows a signal at input terminal B8. Line *f* shows the signal applied to the base 60 of the transistor 62 and the line *g* shows the output signal available at the output terminal 68 of the transistor 62. It is assumed in the first sample pulse time shown that signals are available at the terminals B1 and B4 at the same time. This would be equivalent to receipt of a coded pattern having a value, from lowest order to highest order, of 1010 or a binary 5. Thus, terminals B1 and B4 would have signals having values equal to 1 impressed upon them whereas the terminals B2 and B8 would have 0 valued signals impressed thereon. During the occurrence of the signals at the terminals B1 and B4, the sampling pulse will arrive and will cause the AND gates 8 and 24 to provide output signals to their respective capacitors C1 and C4 causing them to be charged to a value equivalent to the amplitude of the sampling signal, providing that the sampling signal is less negative than or equal to the digital signal. Where the digital signals are less negative than the sampling signals the voltage across the capacitors storing such signals will vary according with the voltages of the digital signals. Thus, signals at the output, as more fully explained below, will vary somewhat in amplitude but not in period.

When the sampling signal is less negative than or equal to all of the input digital signals then the capacitor C1 and C4 will have the same voltage across them. However, due to the capacity of C4 being four times that of C1, the total charge stored in C4 will be four times that of C1. C1 is charged through the circuit which includes, in this example, the sampling signal source (not shown), input terminal 9, diode 12, capacitor C1, and diode 40. Diodes 40 is forward biased and diodes 12 and 10 are reversed biased during the charging period. It is also possible to have the charging circuit include input signal source, terminal B1, and diode 10 instead of the path providing the sampling signals. This depends on the relative potential of the two signals. A similar charge path is established with respect to capacitors C4. During this period diodes 42 and 48 are back biased, or of little affect. With the termination of the sampling pulse, the capacitors C1 and C4 will produce positive value signals which are impressed upon the diodes 50 and 54 and back bias diodes 40 and 46. The OR gate 58 will provide, in response to the signals provided by capacitor C1 and C4, an output signal. This signal is applied to the base 60 of the transistor 62. This signal will result from the capacitors C1 and C4 discharging through the resistor R1. The time taken for discharge of the capacitors C1 and C4 is illustrated in line *f* in a time period after the termination of the first sampling pulse. The discharge of the capacitor C4 taking four times longer than that of capacitor C1 and thus a signal of five units is provided. As shown, the transistor 62 will produce a positive output signal (taken across resistor 64) in the absence of any signal applied to its base 60 from the capacitors C1, C2, C4, and C8 and the OR gate 58. The value of resistor R1 together with the −V supply is sufficient to bias the transistor to its ON state. However, the presence of the positive signal due to the discharge of the capacitors C1 and C4, will be such to raise the base 60 of the transistor 62 to a positive value and thus cut OFF the transistor 62 for a period proportional to the five unit discharge length of the capacitors C1 and C4. During this time a negative value signal is produced by the transistor 62, which signal is the result of the −V supply and the resistor 64 connected to the collector 66 of the transistor 62. This output is shown in line *g* of FIG. 2 wherein the transistor output is a positive value until the termination of the sampling pulse, but after termination of the sampling pulse, and during the discharge time of the capacitors C1 and C4, the transistor 62 will produce a negative output.

During the next example, that is, during the second sampling pulse time shown, it is assumed that the terminals B2 and B8 receive input signals. This total input will produce charges in capacitors C2 and C8 which in turn will produce a signal which is 10 units in length, and will thus cause the transistor 62 to produce a negative output for a length of time equal to 10 units. The final example, that is during the third sampling pulse time, shows the application of a signal only to line B4 and shows the output to be of negative value for a four unit duration. It should be understood that the output transistor 62 could be held in the off condition and turned on by the output signals from the OR gate 58 merely by altering the voltage polarities and diode poling or by changing the transistor type to NPN.

While the preferred embodiment of this invention has been described it should be understood that various changes, omissions and additions may be made to the device as described by those skilled in the art without departing from the spirit or scope of this invention.

What I claim is:

1. Apparatus for translating digital signals into analog signals of the type employing sampling signals, said apparatus comprising:

a. first gating means for receiving both the digital signals and the sampling signals, said first gating means comprising:
   1. a plurality of input terminals, one input terminal for each code unit of the digital code;
   2. a plurality of first gating circuits, each of said input terminals coupled to said first gating circuits; and
   3. connecting means for coupling the sampling signals to each of said first gating circuits, each of said first gating circuits being operative upon the simultaneous presence of the coded digital signals and the sampling signals;

b. means for storing third signals in response to the receipt of the sampling signals and digital signals by said first gating means;

c. second gating means responsive to the absence of the sampling signals and presence of the digital signals for gating through said stored reference signals; and d. means responsive to said second gating means for providing analog signals indicative of said signals gated through said second gating means; the sampling and digital signals each having differing periods of duration and the sampling signals having a shorter duration than the digital signals and, herein the analog signals begin after the end of the signals having the shorter duration; said first gating means causes the storage of said third signals upon said first gating means gating both the digital signals and, substantially at the same time, the sampling signals; said third signal is a reference voltage biasing said first gating means; said storing means includes a plurality of capacitors; each of said first gating circuits having coupled thereto at least one of said capacitors, said second gating means including a second gating circuit, said second gating circuit coupled to each one of said capacitors and permitting the passage of said signals stored in said storing means upon the termination of the sampling signals; said means including output means for providing analog signals coupled to said second gating circuit and responsive to said signals passing therethrough for producing the analog signals having a duration proportional to the code unit of the coded digital signals.

2. An apparatus as recited in claim 1 wherein said capacitors have a storage capacity proportional to the associated code units of the digital code, each one of said capacitors being associated with each one of said first gating circuits.

3. A translator as recited in claim 2 wherein said capacitors are charged in the presence of said third signals for a period equal to said sampling signals and to a voltage equal to said sampling signal voltage level, said capacitors being discharged upon termination of said sampling signal and producing further signals of duration which are proportional to the capacity of the capacitors receiving said third signals.

4. A translator as recited in claim 3 wherein said second gating circuit is an OR gate, said OR gate acting to sum the further signals received from said capacitors such that said output means receives an input signal of duration proportional to the storage capacities of said capacitors.

5. Apparatus as defined in claim 4 wherein said output means include a transistor having a base electrode, emitter electrode, and a collector electrode; said OR gate connected to said transistor base electrode, said transistor having bias means coupled to said emitter and said collector electrodes such that said transistor is normally ON except in the presence of signals from said capacitors whereupon the output of said transistor is OFF providing said analog signal; said storing means including diodes, one of said diodes coupling each one of said capacitors to ground, each of said diodes being joined to each of said capacitors at said capacitor junction with said OR gate, and said diodes being ON during the charging of said capacitors.

6. Apparatus for translating digital signals into analog signals of the type employing sampling signals, the sampling signals and digital signals having differing periods of duration, said apparatus comprising:

a. first gating means for receiving both the digital and sampling signals;

b. means for storing third signals indicative of the digital signals received by said first gating means;

c. second gating means responsive to said sampling signals for gating through said signals stored by said storing means; and d. means responsive to said second gating means for providing the analog signals; said first gating means includes a plurality of AND gates, one of said AND gates for each coded input of the digital signals, said AND gates being operative only upon the presence of the sampling and digital signals.

7. An apparatus as recited in claim 6 wherein said responsive means providing the analog signals after the termination of either the digital or sampling signals, whichever of the two have a shorter duration.

8. An apparatus as recited in claim 7 wherein said storing means stores signals indicative of said signals gated by said first gating means.

9. An apparatus as recited in claim 6 wherein said first gating means including a plurality of AND gates, one of said AND gates for each coded input of the digital signals, said AND gates being operative only upon the presence of the sampling and digital signals.

10. An apparatus as recited in claim 6 wherein said second gating means including a logical OR gate for summing said stored signals.

11. An apparatus as recited in claim 6 wherein said storing means comprising a plurality of capacitors, at least one capacitor for each of the code digits of the digital signals, the output of said capacitors being summed by said second gating means.